United States Patent [19]

Forti et al.

[11] Patent Number: 4,707,519

[45] Date of Patent: Nov. 17, 1987

[54] PROCESS FOR THE PREPARATION OF POLYOLEFINIC PLASTO-ELASTOMERIC COMPOSITIONS

[75] Inventors: Sergio Forti; Enea Garagnani, both of Ferrara; Daniele Romanini, Novara, all of Italy

[73] Assignee: HIMONT Incorporated, Wilmington, Del.

[21] Appl. No.: 868,274

[22] Filed: May 28, 1986

[30] Foreign Application Priority Data

May 31, 1985 [IT] Italy ................................ 20992 A/85

[51] Int. Cl.$^4$ ............................................. C08L 61/10
[52] U.S. Cl. .................................... 525/133; 525/140; 525/141
[58] Field of Search .................. 525/133, 141, 140, 68

[56] References Cited

U.S. PATENT DOCUMENTS 2,794,009  5/1957  Gunberg ............................ 260/33.6
4,477,631 10/1984  Danesi et al. ....................... 525/133

Primary Examiner—Theodore E. Pertilla

[57] ABSTRACT

Plasto-elastomeric compositions with improved processability and high elasto-mechanical properties, consisting of mixes of a cross-linked EPDM rubber and a thermoplastic olefinic polymer, are prepared by the dynamic vulcanization method, using as cross-linking agent for the rubbery component a system comprising a non-halogenated phenolic resin, zinc oxide and p-toluenesulfonic acid.

6 Claims, No Drawings

PROCESS FOR THE PREPARATION OF POLYOLEFINIC PLASTO-ELASTOMERIC COMPOSITIONS

BACKGROUND OF INVENTION

The preparation of a composition based on thermoplastic polymers and vulcanized rubbers, according to the method of dynamic vulcanization, is known in the prior art and is described in particular in U.S. Pat. Nos. 3,758,643; 3,862,106; 3,037,954 and 3,806,558.

According to the above mentioned method, the vulcanization of the elastomeric component is made to occur during the mixing or mastication with a molten plastomeric polymer, by the aid of cross-linking agents which in general are of conventional type, such as for instance peroxides, azidic compounds, mixtures of sulfur with zinc oxide, substituted ureas, thiocarbamates, etc. If in the mix which is thus treated there is present a sufficient quantity of plastomeric polymer, the composition, at the end of the vulcanization of the elastomeric component, will maintain good processability properties under heat even at high percentages of vulcanized elastomer.

According to French Patent No. 2,408,632, plastic-elastomeric compositions may be obtained by dynamical vulcanization methods, using as a cross-linking agent a halogenated phenolic resin, or a non-halogenated resin, however associated to halogen-donors in combination with a metal oxide (activator).

According to said French Patent, the mix of EPDM rubber and olefinic polymer with the phenolic resin in a proportion of from 5% to 20%, with respect to the rubber, is, subjected to a temperature sufficient for melting the olefinic polymer, thereafter the activator is added in a quantity generally not higher than 0.6% by weight of the total, and thereupon carrying on the mastication at a temperature at which the cross-linking of the elastomeric component occurs.

However, the compositions obtained by the dynamical vulcanization method show, as a feature common to all the compositions based on mixes of plastomeric polymers with cross-linked elastomers, the drawback of being so much more difficult to be processed or heat-moulded, the higher the percentage of cross-linked elastomeric component present in these compositions.

THE PRESENT INVENTION

Applicants have now found that by the dynamical vulcanization methods, there are obtained compositions based on olefinic plastomers and EPDM rubbers which, with respect to the compositions of the prior art, are endowed with improved processability and higher elasto-mechanical properties even at high temperatures, the degree of the cross-linking of the rubbery component being equal, if as a cross-linking agent a system is used comprising a non-halogenated phenolic resin, zinc oxide and p-toluenesulfonic acid.

In particular, in such a cross-linking system the phenolic resin is present in a quantity ranging from 1 to 20 parts by weight, and preferably, from 5 to 15 parts by weight of 100 parts by weight of the elastomeric component present in the composition to be prepared, the weight ratio of the zinc oxide to the phenolic resin being between 0.5:1 and 6:1, and preferably between 2:1 and 5:1, while the weight ratio of the p-toluenesulfonic acid to the phenolic resin is between 0.01:1 and 0.4:1.

For the purposes of this invention, as an elastomeric with non-conjugated dienic monomer, this last being present in compound there is used a terpolymer of two olefinic monomers a quantity comprised between 1% and 10% by weight of the total weight of the elastomer. Examples of dienic monomers which can be used are: 1,4-hexadiene; 2-methyl-1,4-pentadiene; 1,4,9-decatriene; 1,5-cyclooctadiene; 1-methyl-1,5-cyclooctadiene; 1,4-cycloeptadiene; dicyclopentadiene; ethylidene-norbornene; and the substitution derivatives of said monomers.

Examples of olefinic monomers are ethylene, propylene, 1-butene, 1-pentene, 1-hexene, 4-methyl-1-pentene, 3-methyl-1-pentene, 3,3-dimethyl-1-butene, 3-methyl-1-hexene, and 2,4,4-trimethyl-1-pentene.

Among the terpolymers the preferred one are ethylene-propylene-diene containing from 25% to 50% by weight of copolymerized propylene units.

As olefinic plastomers there may be used the polymers obtained by polymerizing one or more monoolefins by either low- or high pressure processes, such as for instance polyethylene, polypropylene, poly-butene-1, poly-4-methyl-1-pentene, poly-1-hexene, poly-5-methyl-1-hexene, and poly-3-methyl-1-pentene.

The corresponding elastomeric component/plastomeric component ratios in the compositions may vary widely.

Thus, for instance, it is possible to work with plastomeric polymer/elastomeric terpolymer ratios comprised between 20:80 and 70:30; however, it is preferable to work with ratios comprised between 25:75 and 60:40.

The non-halogenated phenolic resins which are part of the vulcanizing system used for the purposes of this invention, are compounds which fall under the following general formula:

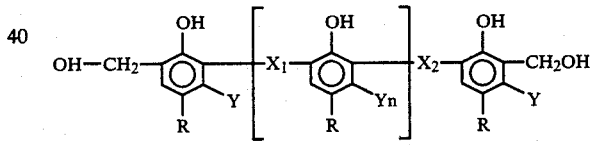

wherein:
$X_1$, $X_2$, equal to or different from each other, are —$CH_2$— or —$CH_2$—O—$CH_2$— radicals;
Y=hydrogen atom or —OH group;
R=alkyl or aryl or alkenyl radical, containing from 4 to 16 carbon atoms; and
n=an integer between 0 and 6, extremes included.

Said compounds are known and may be prepared by condensing alkylphenols with formaldehyde according to the techniques described in the literature, for instance in "Kunststoffe", 52, 1962, pages 19–21 as well as in U.S. Pat. Nos. 1,996,069 and 2,364,192.

Further references to the above mentioned compounds and to the preparation thereof are found in "Caoutchoucs et plastiques" No. 599, March 1980, page 73 and in "Industrial and Engineering Chemistry, vol. 51, No. 8, August 1959, page 937 and in the book by Carswell "Phenoplasts", Interscience Publishers, New York, 1947.

Therefore, object of the present invention is the process for preparing plasto-elastomeric compositions, which process consists in subjecting to mastication and/or mixing a composition comprising an olefinic polymer and an unsaturated elastomeric terpolymer consisting of two olefinic monomers and of a dienic monomer, in the presence of a cross-linking or vulcanizing system for said elastomeric terpolymer, said system comprising from 1 to 20 parts by weight per 100 parts by weight of said terpolymer, of a non-halogenated phenolic resin, as previously defined, and furthermore zinc oxide and p-toluenesulfonic acid, with weight ratios of zinc oxide/phenolic resin between 0.5:1 and 6:1, and p-toluenesulfonic acid/phenolic resin between 0.01:1 and 0.4:1, at a temperature sufficient to melt the olefinic polymer, and for a time sufficient for obtaining a homogeneous mixture, and then by carrying on the mixing or mastication at a temperature at which the elastomeric terpolymer is at least partially cross-linked.

The mastication and/or mixing and cross-linking process may be performed either in an internal mixer or in an extruder, or in a system consisting of an internal mixer combined with a granulator. It is also possible to work in a plurality of apparatus arranged in a sequence, in the first set of which the thorough mixing and homogenization of the composition is performed, while in the other set of appartus the cross-linking is achieved, while still carrying on the mixing or mastication.

The mixing or mastication operation before the cross-linking is aimed to obtain a thorough and homogeneous mixing of the elastomer in the molten elastomeric component with the elastomer in form of particles of micron size, preferably from 0.5 to 1 micron.

Generally, the cross-linking temperature is between 170° and 220° C.

The mastication period at the cross-linking temperature depends on the cross-linking degree desired in the elastomer.

Preferably, the quantity of cross-linked elastomer in the final composition is maintained between 80% and 100% and preferably between 96% and 100% by weight of the total amount of elastomer present in the composition. Mineral fillers, carbon black, coloured pigments, plasticizers, stabilizing agents, extension oils, and in general any other classical ingredient of the compositions based on EPDM rubbers may be present in the mix which undergoes the mastication and cross-linking.

The following examples are given to illustrate the invention, without limiting it to those examples.

EXAMPLES

By working in an internal mixer there are prepared plasto-elastomeric compositions, using the following polymeric components, in quantities indicated in table 1:

EPDM elastomer, consisting of 28% by weight of propylene and 67.2% by weight of ethylene and 4.8% by weight of ethylidene-norbornene, having a density =0.88 g/cc, a Mooney viscosity (ML 121° C.)=30, and extended with 30% by weight of paraffin oil, polypropylene having a M.I. =8.5, p-octylphenol-formaldehyde resin of the resolic type, sold as SP 1045 P.

The polymeric components are fed all together into the mixer and after a short mixing period, the mixture is added with the phenol resin, zinc oxide, p-toluenesulfonic acid, a further quantity of paraffin oil and, if desired, fillers.

The mixing operation is continued at the cross-linking temperature until the desired degree of cross-linking of the elastomer is obtained.

The temperature attained in the cross-linking step is between 190° and 220° C.

The composition is then discharged from the mixer and subjected to the following determinations:

percentage of cross-linked EPDM, by solubility tests in xylene at 125° C.;

processability, by measuring the head pressure in extrusion tests in extruder.

In these tests, the extruder was of the TR 15 type (monoscrew, diameter 15 mm) operating at 230° C., with a spinneret of 2 mm diameter and L/D ratio=20, and output rate 9.5 cc/min.

tension set at 200%, measured at 23° C., according to ASTM D-412, on a test piece punched out from an injection molded ASTM/I specimen compression set after 22 hours at 100° C., according to ASTM D-395 resistance to thermo-oxidation in oven at 150° C.

In table 1 are reported, besides the quantities of products used in the mixing, the properties of the compositions obtained.

| COMPOSITIONS | | | | | | | | CHARACTERISTICS | | | | |
|---|---|---|---|---|---|---|---|---|---|---|---|---|
| EPDM rubber | Polypropylene | Paraffin oil | Resin SP 1045 P | p-toluenesulfonic acid | ZnO | Mica | TiO$_2$ | % of total EPDM cross-linked | pressure in (Kg/cm$^2$) and appearance of the extruded product in TR15 at 230° C. and 9.5 cc/min. | tension set 200% at 23° C. (%) | compression set (22 h at 100° C.) (%) | resistance to thermo-oxidation in oven at 150° C. (days) |
| 54.0 | 13 | 17.9 | 3.6 | — | 10 | — | 1.5 | 81.8 | 85 smooth | 18 | 32 | 18 |
| 61.0 | 15.1 | 19.9 | 4 | 0.3 | — | — | — | 97.8 | 100 slightly shagreened | 15 | 26 | 3 |
| 59.4 | 14.2 | 19.7 | 4 | 0.3 | 1 | — | 1.7 | 98.0 | 100 slightly shagreened | 15 | 26 | 3 |
| 57.0 | 13.7 | 18.9 | 3.8 | 0.3 | 5 | — | 1.6 | 98.6 | 95 smooth | 14 | 25 | 5 |
| 55.0 | 13.5 | 17.9 | 3.6 | 0.3 | 10 | — | — | 99.1 | 90 smooth | 12 | 22 | 14 |
| 54.0 | 13 | 17.9 | 3.6 | 0.3 | — | 10 | 1.5 | 96.8 | 100 slightly shagreened | 16 | 26 | 3 |

What we claim is:

1. In a process for the preparation of a plastoelastomeric composition in which a mixture comprising a molten olefinic polymer, dispersed therein an unsaturated elastomeric terpolymer of 2 olefinic monomers and a diene monomer, a nonhalogenated phenolic resin at 1–20 parts by weight per 100 parts of said terpolymer, and zinc oxide at a ratio to said phenolic resin of 0.5:1–6:1, is masticated at a temperature at which at least partial crosslinking of said terpolymer occurs, the improvement in which said mixture comprises p-toluenesulfonic acid at a weight ratio to said phenolic resin of 0.01:1–0.4:1.

2. A process according to claim 1 in which the weight ratio of olefinic polymer to said terpolymer is 20:80–70:30.

3. A process according to claim 2 in which the weight ratio of said olefinic polymer to said terpolymer is 25:75–60:40.

4. A process according to claim 1 in which the 2 olefinic monomers are ethylene and propylene, and the diene monomers is ethylidene or norbornene.

5. A process according to claim 1 in which the weight ratio of zinc oxide to said phenolic resin is 2:1–5:1.

6. A process according to claim 1 in which the weight ratio of phenolic resin to said terpolymer is 5:100–15:100.

* * * * *

UNITED STATES PATENT AND TRADEMARK OFFICE
CERTIFICATE OF CORRECTION

PATENT NO. : 4,707,519

DATED : November 17, 1987

INVENTOR(S) : Sergio Forti; Enea Garagnani; Daniele Romanini

It is certified that error appears in the above-identified patent and that said Letters Patent is hereby corrected as shown below:

Column 2, lines 2-4, "with non-conjugated dienic monomer, this being present in compound there is used a terpolymer of two olefinic monomers" should read --compound there is used a terpolymer of two olefinic monomers with non-conjugated dienic monomer, this last being present in--.

Column 3, line 27, "elastomeric" should read --plastomeric--.

Column 6, line 3, "monomers" should read --monomer--.

Signed and Sealed this

Twenty-sixth Day of April, 1988

Attest:

DONALD J. QUIGG

*Attesting Officer*   *Commissioner of Patents and Trademarks*